(12) United States Patent
Umezato

(10) Patent No.: US 6,867,881 B1
(45) Date of Patent: Mar. 15, 2005

(54) COMPUTER READABLE DATA STORAGE MEDIUM STORING A PROGRAM FOR DISPLAYING READING CONDITIONS OF CHANGEABLE DEFAULT INFORMATION

(75) Inventor: Keiji Umezato, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 435 days.

(21) Appl. No.: 09/709,355

(22) Filed: Nov. 13, 2000

(30) Foreign Application Priority Data

Nov. 12, 1999 (JP) ............................................ 11-322269

(51) Int. Cl.⁷ ........................ H04N 1/382; G06K 15/00
(52) U.S. Cl. ...................................... 358/1.2; 358/450
(58) Field of Search ................................ 358/1.2, 3.11, 358/3.12, 1.15, 449, 450, 452, 453, 1.16, 401, 471, 404, 444; 345/619, 660, 670, 671

(56) References Cited

U.S. PATENT DOCUMENTS 5,913,072 A * 6/1999 Wieringa .................... 395/832
6,007,195 A * 12/1999 Kokubo ...................... 347/108
6,256,662 B1 * 7/2001 Lo .............................. 709/203
6,313,923 B1 * 11/2001 Takanashi ................... 358/1.18
6,529,453 B1 * 3/2003 Otsuka ..................... 369/30.32
2001/0027396 A1 * 10/2001 Sato ............................ 704/260

FOREIGN PATENT DOCUMENTS

JP          10-147043       6/1998
JP          410149331     * 6/1998  ........... G06F/13/14

* cited by examiner

Primary Examiner—Jerome Grant, II
(74) Attorney, Agent, or Firm—Oblon, Spivak, McClelland, Maier & Neustadt, P.C.

(57) ABSTRACT

An electronic filling system includes a personal computer haying a display with a scanner. A program and/or data storage medium is provided to store at least a program enabling the display to display a reading condition inputting screen. The program and/or data storage medium also stores information of one or more reading conditions as a personal default which is generated by a user through the reading condition inputting screen. The scanner reads image data based on the one or more reading conditions of the personal default, and the image data read in stored in the program and/or data storage medium.

15 Claims, 5 Drawing Sheets

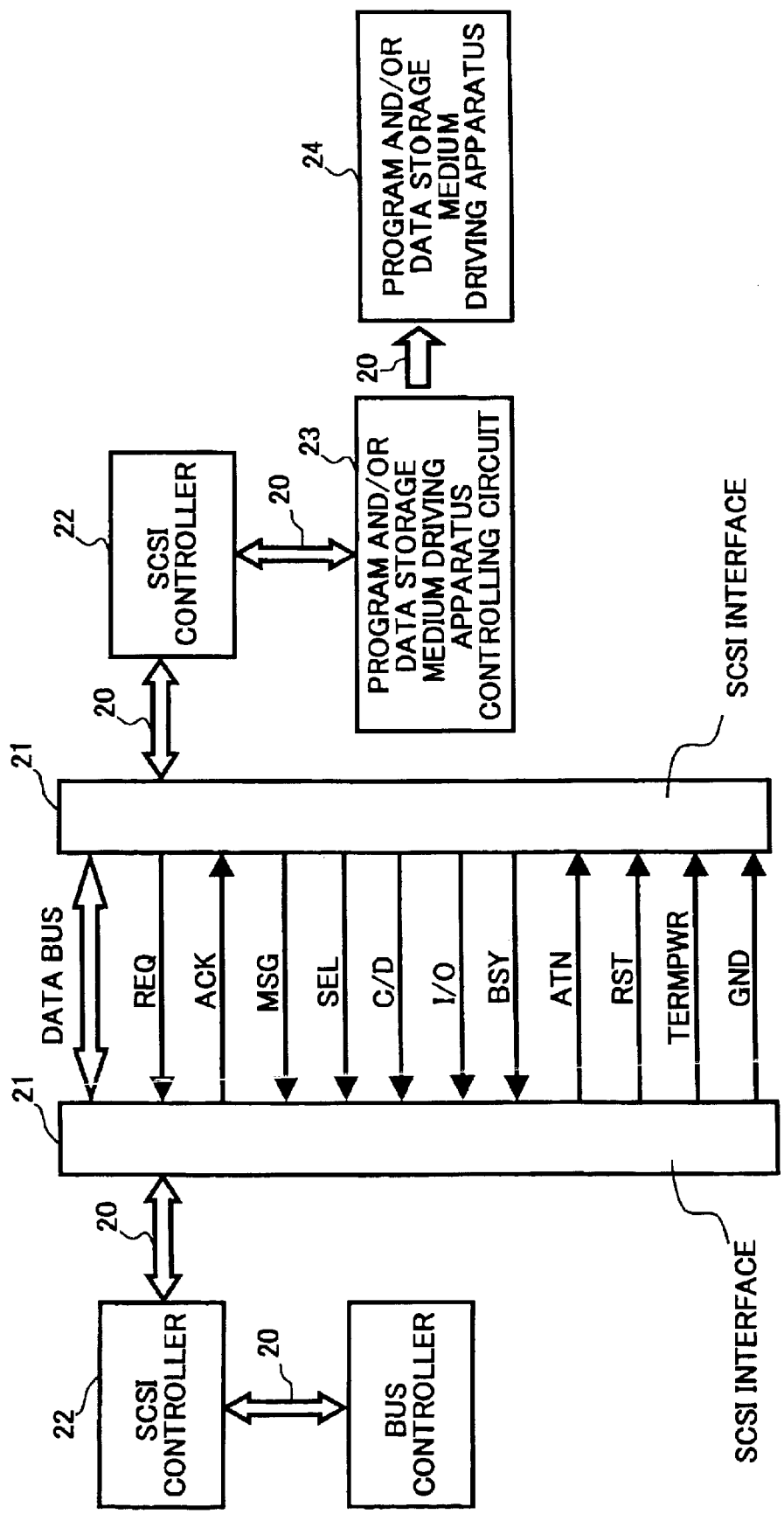

COMPUTER READABLE DATA STORAGE MEDIUM STORING A PROGRAM FOR DISPLAYING READING CONDITIONS OF CHANGEABLE DEFAULT INFORMATION

CROSS REFERENCE TO RELATED APPLICATIONS

This application claims priority under 35 USC §119 to Japanese Patent Application No. 11-322269 filed on Nov. 12, 1999, the entire contents of which are hereby incorporated herein by reference.

BACKGROUND OF THE INVENTION

1. Field of the Invention

The present invention generally relates to an electronic filing system, and in particular relates to an electronic filing system capable of automatically starting a document reading operation under prescribed reading conditions stored as private use default in a program and/or data storage medium which is detachably mounted to a personal computer.

2. Discussion of the Background

One general problem in background original document reading systems is that one or more reading conditions are required to be set per each of original documents to be read before reading, because the document reading conditions generally vary based on the kind of the original document to be read.

Further, the appropriate setting of reading conditions generally requires a prescribed level of skill. Thus, it is generally difficult for a document reading system to be designed so that prescribed reading conditions are automatically set per each of the original documents to be read, and accordingly, background image filing systems usually do not employ such a document reading system.

Japanese Patent Application No. 869519 describes an image filing system which includes an original document-reading device and simplifies an operation, such as selecting an operation menu and setting original document reading conditions, for a reading apparatus. Moreover a reading operation is automatically started when an original document is set.

Such a background electronic filing system is equipped with an original document existence-detecting device and is capable of registering, storing, and retrieving image data obtained by the reading apparatus. Thus, a registering operation (i.e. a data storing operation) is automatically started when setting of the original document is detected and the electronic filing system is on input-standby.

The background electronic filing system is also equipped with a reading condition maintaining apparatus for maintaining one or more reading conditions set previously, wherein image data of an original document is automatically read and registered based on the set reading conditions.

However, the Japanese Laid Open Patent Application No. 8-69519 does not refer to a recording apparatus for recording image data read from the original document in a program and/or data storage medium, and rather discloses that the image data is stored in a RAM of a personal computer.

On the other hand, a user may sometimes desire to operate the electronic filing system under prescribed document reading conditions of private use rather than a prescribed commonly used default to satisfy his or her preference. In such a case, if reading conditions of the default are modified and stored in a prescribed area, which is secured in a hard disc of the personal computer, an effort of the user increases due to having to input a necessary ID and request the modified reading conditions from the hard disc. In addition, maintenance of various IDs is generally burdensome for a company.

SUMMARY OF THE INVENTION

Accordingly, an object of the present invention is to address such problems and provide a novel electronic filing system including a personal computer having a display with a scanner. A program and/or data storage medium may be provided to store at least a program enabling the display to display a reading condition inputting screen. The program and/or data storage medium may also store information of one or more reading conditions as a personal default which is generated by a user through the reading condition inputting screen. The scanner can then read image data based on the one or more reading conditions of the personal default.

In another aspect of the present invention, the image data read may be stored in the program and/or data storage medium.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a schematic chart mainly illustrating an interface which interfaces with a driving apparatus for driving the computer readable program and/or data storage medium according to the present invention.

DETAILED DESCRIPTION OF THE PREFERRED EMBODIMENT

Figure 1:
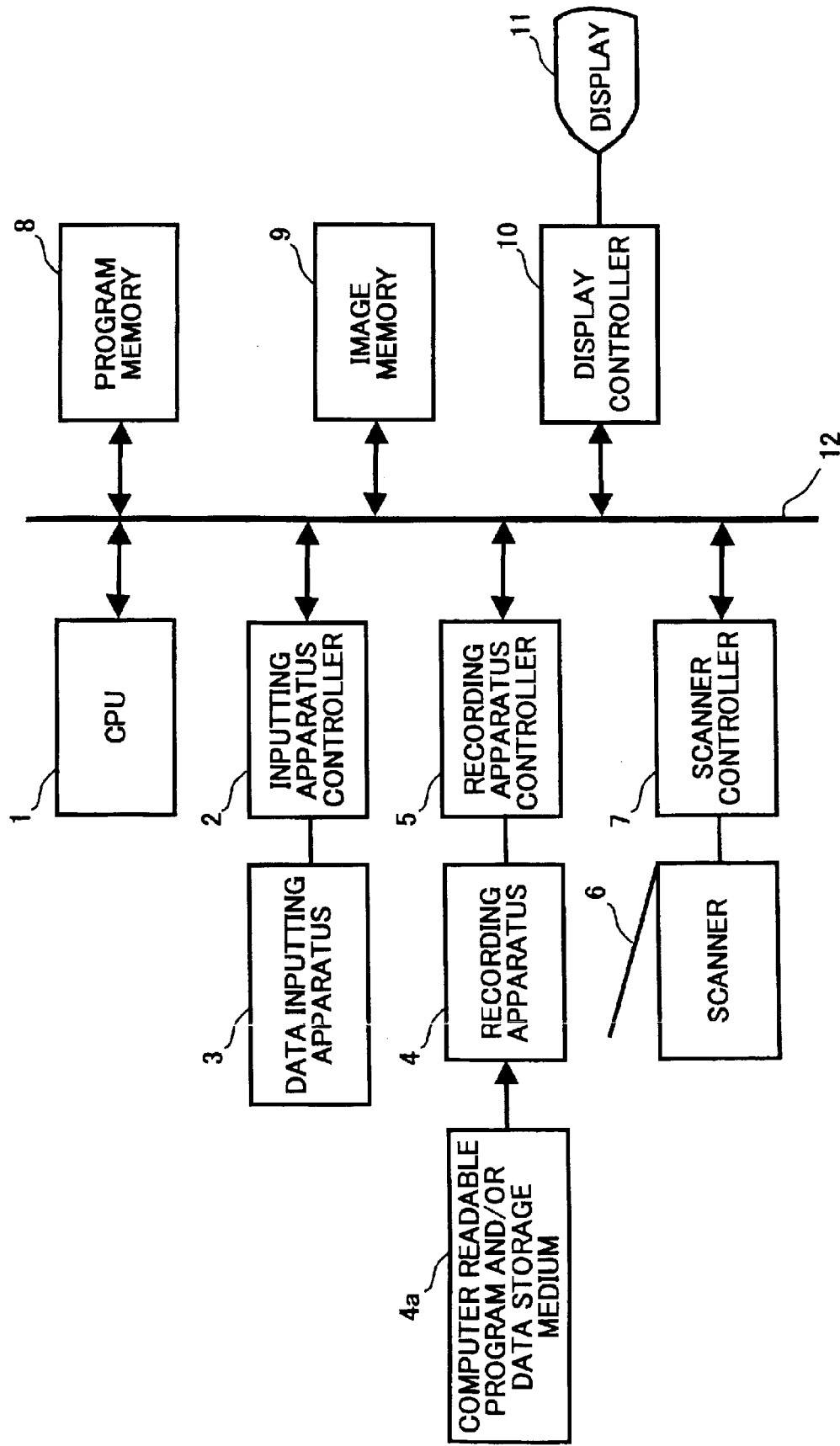
FIG. 1 is a block chart illustrating a construction of an electronic filing system of one embodiment of the present invention.

Referring now to the drawings, wherein like reference numerals and marks designate identical or corresponding parts throughout the several figures, and in particular to FIG. 1, a CPU (central processing unit) 1 may be provided so as to execute a plurality of programs stored in a program memory 8. The programs may include a system control program, operating software, and similar programs in addition to an application program that realizes the present invention. The CPU 1 may process a variety of data stored in the program memory 8, and communicate with a variety of controllers 2, 5, 7, and 10 via a system bus 12.

A data inputting apparatus controller 2 may be provided so as to control a data inputting apparatus 3, and to transmit an electrical signal sent from the data inputting apparatus 3 to an interior of the electronic filing system via the system bus 12. The inputting apparatus controller 2 may send to the interior details of a problem which occurs in the data inputting apparatus 3.

The data inputting apparatus 3 may convert a signal generated by an operator into an electrical signal, and transmit the electrical signal to the data inputting apparatus controller 2. The data inputting apparatus 3 may include any one of a key-inputting apparatus, a pointing device, a touch panel, or the like (each not shown). The data inputting apparatus controller 2 may be selectively employed corresponding to a kind of the data inputting apparatus 3.

A recording apparatus 4 may be provided so as to drive and record information in a program and/or data storage medium 4a. The recording apparatus 4 can not include a read only apparatus and premises an apparatus capable of data writing (i.e., recording) in addition to reading. Both of writing and recording operations may be practiced in a unit of an electronic file using a common format. An amount of data stored in the file may not be limited, but a capacity of the program and/or data storage medium 4a itself may be limited.

The program and/or data storage medium 4a may include one of a magnetic disc, a semiconductor disc, an optical/magnetic disc, or other similar storage mediums. Specifically, a CD-RW, a CVDRAM, a MO, a FD, a ZIP, a smart media, a compact flash memory, a memory stick, or the like, all of which are currently available, may be included. However, the program and/or data storage medium 4a is not limited to those storage mediums and any memory can be employed if it is simply portable. A prescribed recording apparatus 4 may be selected corresponding to a kind of a program and/or data storage medium 4a.

A recording apparatus controller 5 may be provided so as to control the recording apparatus 4. The recording apparatus controller 5 may be connected to the recording apparatus 4 via a standard interface. The recording apparatus controller 5 can be integrated with the recording apparatus 4 and assembled to the personal computer as an internal type. The recording apparatus controller 5 may mainly perform a function of transferring data existing in the electronic filing system to and from the recording apparatus 4.

To prevent a low throughput of the electronic filling system, a DMA (direct memory access) control may generally be practiced. Moreover, the recording apparatus controller 5 may include a variety of monitoring functions, for example, monitoring of a condition such as whether a program and/or data storage medium 4a is connected or not to the recording apparatus 4. A plurality of operational conditions of the recording apparatus 4 itself, for example, power ON/OFF, abnormality detection such as detecting the existence of a reading impossible range or data destruction, may also be monitored. A monitoring result may be transmitted to the CPU 1 separately from transfer data as device information by a hardware interrupt.

A scanner controller 7 may be provided so as to control the scanner 6. Specifically, the scanner controller 7 may automatically set an image reading resolution, a tone, a color, a brightness, and a reading range based on set reading conditions. In addition, the scanner controller 7 may detect a problem occurring in the scanner 6 while executing the image reading operation.

The program memory 8 may be provided to store programs to be executed by the CPU 1 as described earlier. An image memory 9 may also be provided to store image data. Both of reading and writing operations of the image data may be performed responsive to a request. A display controller 10 may be provided to control a display 11 that displays both of image data and a later described reading condition-inputting screen. The system bus 12 may be provided and include a control bus or the like.

Figure 2:
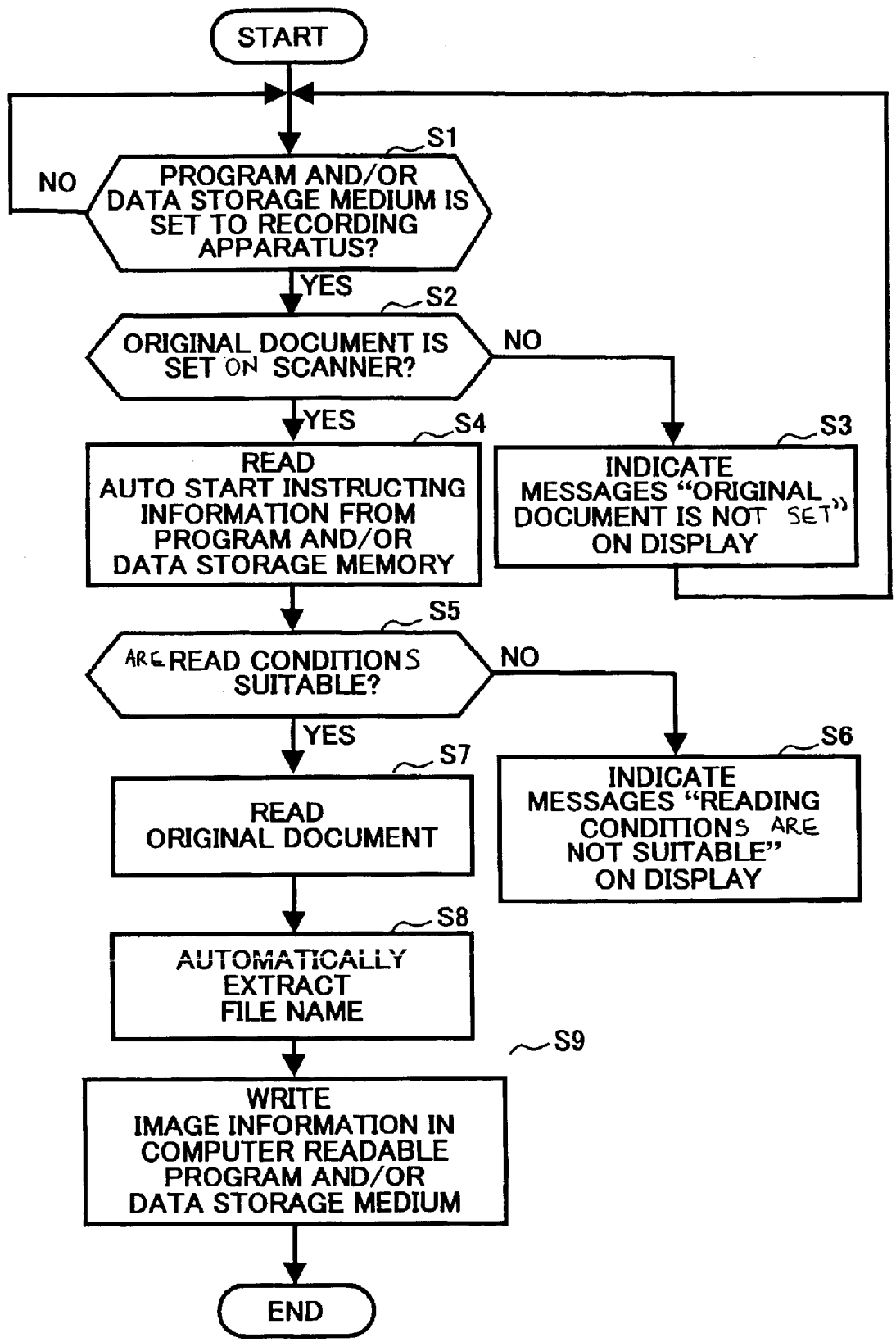
FIG. 2 is a flowchart illustrating an operational procedure of the electronic filing system illustrated in FIG. 1.

FIG. 2 is a flowchart illustrating one example of an operation of the electronic filing system of the present invention. An operator may set an original document on the scanner 6, and also connect the program and/or data storage medium 4a to the recording apparatus 4. The recording apparatus controller 5 may then detect connection of the program and/or data storage medium 4a to the recording apparatus 4 (in step S1). The detection result may be sent to the interior of the electronic filing system via the system bus 12. An image reading program stored in the personal computer may initially wait for the program and/or data storage medium 4a to be connected while not performing any process.

Subsequently, when the connecting of the program and/or data storage medium 4a is confirmed in step S1, the scanner controller 7 then detects whether the original document is set on the scanner 6 (in step S2). If the original document is set on the scanner 6 (yes in step S2), the scanner controller 7 can detect the original document and send the detection result to the CPU 1 via the system bus 12. If the scanner controller 7 does not detect the original document (no in step S2), a reading operation may be inhibited and messages, such as stating "Original Document is Not Set" can be displayed on the display 11 (in step S3). The electronic filing system may then return to the step S1.

Alternatively, if the operator recognizes that the original document is not set, the operator can return the electronic filing system to an initial operation state by disconnecting the program and/or data storage medium 4a from the recording apparatus 4. If the reading operation is to continue, the original document should then be placed on the scanner 6.

Otherwise, to prevent the program and/or data storage medium 4a from being disconnected from the recording apparatus 4, a message, such as stating "Original Document Should Be Set" may be indicated on the display 11 (in step S3). The original document may then be detected again (in step S2) when the operator places the original document on the scanner 6.

An automatic start instructing information 31 (FIG. 3), which will be described later in detail, may be read from the program and/or data storage medium 4a when the program and/or data storage medium 4a is connected to the recording apparatus 4 (in step S4). Subsequently, it is determined whether the reading conditions preserved in the program and/or data storage medium 4a are suitable (i.e, if the reading conditions can be realized, for example, by a color scanner or a multi-functional printer, connected to an applicable personal computer) may be determined (in step S5). If suitable (yes in step S5), the process may proceed to an image reading operation (in step S7).

To the contrary, if the program and/or data storage medium 4a is not suitable (no in step S5), a messages stating "Reading Conditions Are Not Suitable" may be indicated on the display 11 (in step S6). The image reading program may then stop its operation because the reading operation should be discontinued. When the program and/or data storage medium 4a is suitable, an image may be read by the scanner 6 based on the prescribed original document reading conditions (in step S7).

Alternatively, even if suitable, a prescribed step wherein original document reading conditions are changed can be employed before executing the step S7.

Image data read by the scanner 6 may be transmitted from the scanner controller 7 to the image memory 9 via the system bus 12. When the reading operation is completed, a prescribed file name may be automatically obtained (in step S8). Subsequently, image data in the image memory 9 may be written in the program and/or data storage medium 4a by the recording apparatus 4 with the file name (in step S9). The file name can automatically be assigned, e.g., by extracting and recognizing a few of leading characters of the read image data using a character recognition application.

To detect whether the program and/or data storage medium 4a is connected to the recording apparatus 4, the recording apparatus 4 may only be required to be connected to the CPU 1 via a later described SCSI interface. This is the case because the SCSI controller 22 of the host computer (not shown) side may always monitor a condition of the program and/or data storage medium driving apparatus 24 via the SCSI interface.

For example, if a "Test Unit Ready" command is sent forth, a usage condition of the recording apparatus 4 may be examined by the SCSI controller 22. Specifically, it can be determined by simply examining a condition of a response to the "Test Unit Ready" command (i.e., contents of a device state resister, not shown) whether the program and/or data storage medium 4a is connected. If the usage condition is periodically examined, setting of the program and/or data storage medium 4a can be readily detected.

Figure 3:
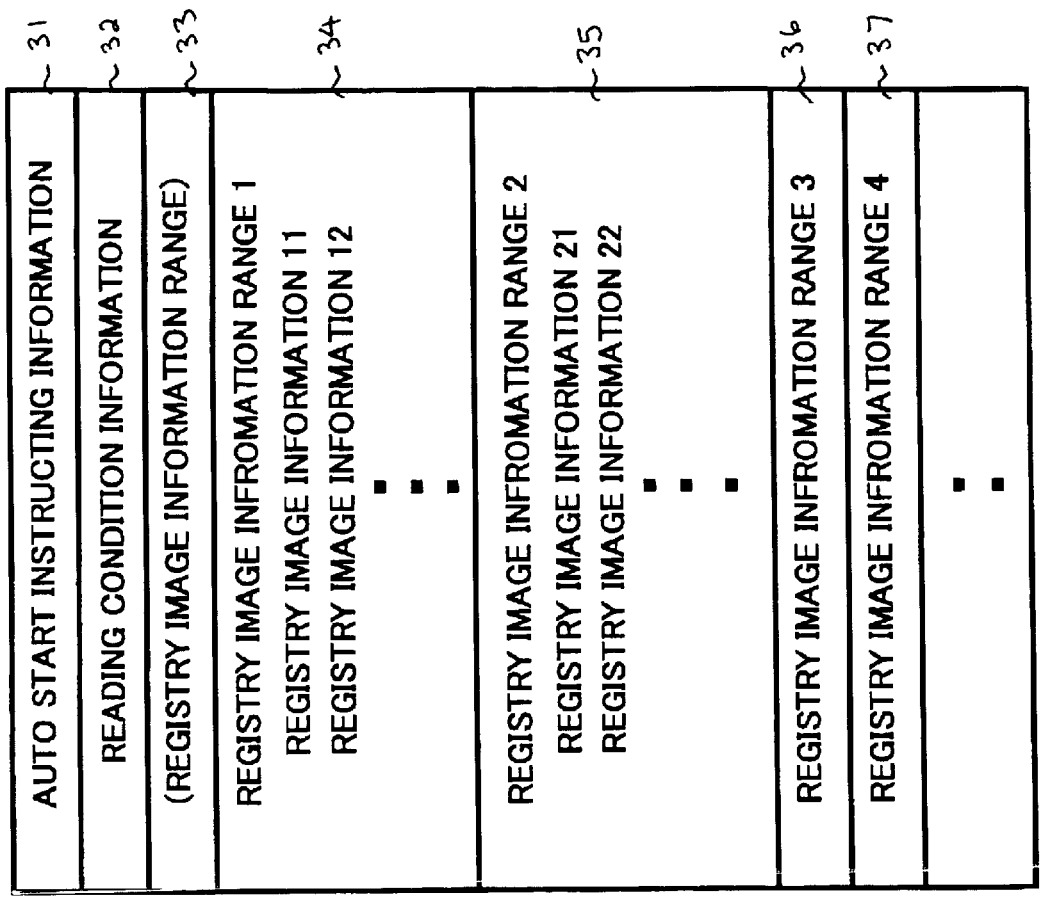
FIG. 3 is a chart illustrating a construction of data stored in a computer readable program and/or data storage medium according to the present-invention.

FIG. 3 is a chart illustrating a construction of data stored in the program and/or data storage medium 4a. The program and/or data storage medium 4a may at least include the auto start instructing information 31 (i.e. program) which may start a reading condition setting software, one or more reading condition information 32, and one or more image information read 33–37. The auto start instructing information 31 may be stored in a prescribed area of the program and/or data storage medium 4a The reading condition setting software (i.e., program) may at least enable the electronic filing system to display a reading condition inputting screen having commonly used default reading conditions, allow modifications of the commonly used default reading conditions, and preserve the modifications.

The reading condition setting software may be installed either in a hard disc of the personal computer or in the program and/or data storage medium 4a.

The auto start instructing information 31 may at least require information which is referred to when it is confirmed whether the program and/or data storage medium 4a includes a data construction suitable for the image reading program. To this end, a version name of the image reading program may be stored in the auto start instructing information 31 when the reading condition setting software is stored in the hard disc.

An ID (identification) or a password may also be stored in the auto start instructing information 31. The image reading program may examine that ID information and determine whether the suitable information is included therein. Specifically, the image reading program may determine whether any one of a prescribed ID and the version name accords with the image reading program (i.e., whether compatibility is secured).

The auto start instructing information 31 may be previously stored in the program and/or data storage medium 4a and initially read when connected to a prescribed drive. If the reading condition setting software is installed in the hard disc and a CD-RW or the like is newly purchased, a prescribed formatting use program may be executed so as to format the CD-RW or the like by only writing the auto start instructing information 31 therein.

If the image reading program can not recognize these information, a reading condition is determined as not suitable (in step S5).

Figure 4:
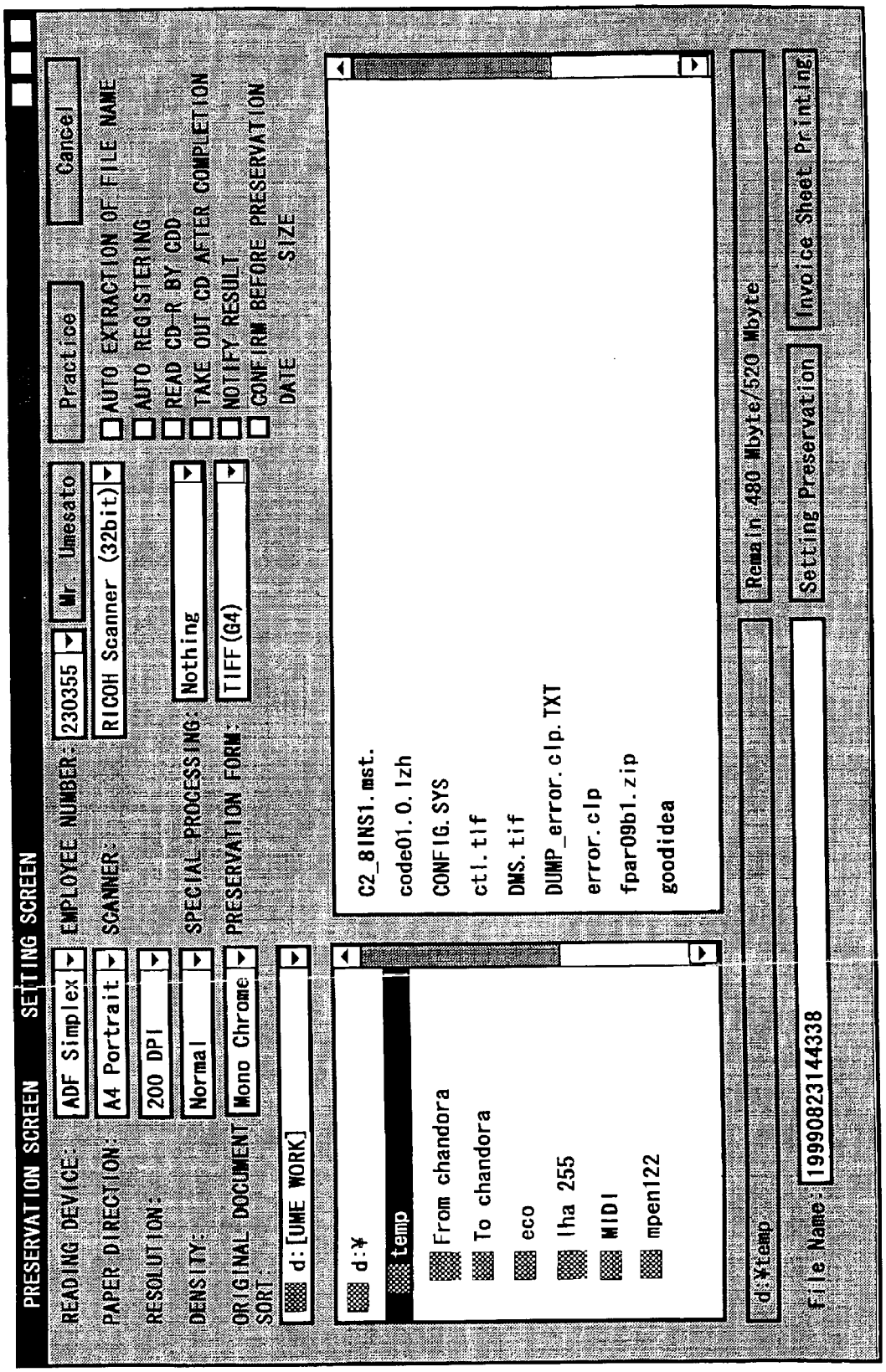
FIG. 4 is a chart illustrating one example of an inputting screen provided in a personal computer for inputting one or more reading conditions as a private use default according to the present invention.

FIG. 4 is a chart illustrating one example of a reading condition inputting screen displayed on the display 11 of the personal computer for inputting or changing one or more reading conditions as a private use default. As described earlier, the reading condition inputting screen may be displayed by practicing the reading condition inputting software. A plurality of reading conditions may be previously input and stored as a commonly used default in the program and/or data storage medium 4a, so that the image reading program can immediately be practiced to start a reading operation based on the reading conditions when the program and/or data storage medium 4a is connected.

The reading conditions may be changed by a reading condition inputting operation through the inputting screen of FIG. 4. One or more changed reading conditions may be preserved and utilized in a next operation by depressing a set/preservation key as illustrated in FIG. 4 as a modified default (i.e., private use default). The plurality of reading conditions optionally input and changed is as follows.

As a condition for a reading device, it is designated and input whether an original document is set on the scanner 6 one by one, and/or whether one side or both sides of the original document are to be read in each of the above cases. A setting direction of an original document is designated and input as a condition of a sheet direction, because a reading range of the scanner 6, and accordingly a writing range, does not accord with a sheet unless it is designated whether the original document is set either in a landscape state or in a portrait state.

A scanning pitch of the scanner in a main scanning direction may be designated and input as a condition of a resolution. When the resolution is set high, an image taken in by the scanner 6 may generally be sharp. However, since an information amount increases in such a case, a number of original documents available to be read (i.e., images possibly obtained from the original document) and stored in the program and/or data storage medium 4a may decrease. In addition, an image-processing load may be heavier.

Since the same resolution may not be required when reading an original document including only characters and when reading an original document including both characters and pictures, a different resolution may be set depending on the type of original document. As a condition of a density, the brightness of a read image may be designated by adjusting either a sensitivity of a reading sensor (not shown) or an intensity of a light irradiated from a light source to the reading surface of the original document.

Owing to such density adjustment, a certain amount of stain appearing on the original document can be avoided from being read by the scanner 6. Moreover, if an original document is prepared with thin ink, a density may also be adjusted in a prescribed manner so that an image becomes acceptably readable. A monochrome or a prescribed color or the like may be designated and input as a condition of the type of an original document. Thus, characteristics of image data such as any one of brightness and color may be determined. Since an image includes inherent information per each pixel, a monochrome image, which includes only brightness information, may be required to have only gradient information.

An employee number may be input as a condition of a user for identifying an administrator of data. Driver software which controls an operation of a scanner controller 7 may be designated and input as a scanner operation condition. The scanner 6 may generally be connected to the host computer via a standard interface such as a SCSI, and may communicate reading and practicing programs via the driver software with the CPU 1.

Since the scanner 6 is generally manufactured based on a prescribed standard such as TWAIN, the image reading program can determine its performance simply based on the standard regardless of the type of scanner. The scanner driver software is generally supplied to a customer from a manufacturer of the scanners, and the type of such a scanner connected to the personal computer may be designated and input. A predetermined special treatment such as correction of disorder of printed pages can be designated and input.

A prescribed data storing form such as an Excel or a Word may be designated and input as a condition of a data storing form. Any one of a TIFF form, a BMP form, a JPEG form, and a GIF form may also be designated and input as a condition of an image data form. Image data generally includes information per one pixel. However, an amount of the information may vary depending on an image reading condition. Moreover, since an ambient pixel of a target pixel generally includes continuous information due to inherent characteristics of the image data, common information may sometimes be included in each of the pixels. Thus, the information may sometimes be unnecessarily long. To this end, the image data is generally compressed under a prescribed rule. In such a case, the image data can be reproduced if a prescribed compressing and decompressing algorithm is employed by its designation. Thus, the image data may be stored in a prescribed form selected in the image data storing form-inputting operation.

An extension element may be assigned to a file name to be used when data is stored and to represent a compression form identification. A prescribed file storing location may be designated and input as a condition of a file.

If a plurality of recording apparatuses 4 are utilized, a prescribed drive and directory can be designated and input. A variety of performances, such as any one of an automatic file extraction, automatic registry, result notification, and confirmation before preserving reading conditions, can be additionally designated and input as optional reading conditions.

The above-described each of the information condition inputting operations may be executed by clicking an applicable check box as illustrated in FIG. 4 and/or selecting applicable ones of conditions.

FIG. 5 is a chart mainly illustrating an interface that interfaces with a driving apparatus 24 that drives the program and/or data storage medium 4a. As shown in FIG. 5, a control bus 20, a SCSI interface 21, and a control circuit 23 for controlling the recording medium driving apparatus 24 may be provided beside the driving apparatus 24. The SCSI controller 22 (right side in FIG. 5), the control circuit 23, and the driving apparatus 24 may collectively constitute the recording apparatus 4 and its controller 5 illustrated in FIG. 1.

A SCSI cable and a connector (each not shown) may be provided collectively to constitute the SCSI interface 21. A signal line may be assigned by the data bus and a control line as illustrated in FIG. 5. A plurality of signals conveyed through the signal line may be grouped as described below. Further, eight data lines and one parity line (not shown), for a total of nine lines, may constitute the data bus 20. Beside data, a plurality of commands and status messages may be communicated through the data bus 20. Both of REQ and ACK may control a timing of data transfer. All of MSG, SEL, C/D, and I/O may determine a manner of using data bus 20 and a phase. All of BSY, ATN, and RST may directly control a busy state and reset or the like. TERMPWR may be of terminator power-supply control use. GND may be of grand control use.

The SCSI controller 22 may control a performance of the SCSI interface. The SCSI controller 22 may control a phase and data transmission to the program and/or data storage medium driving apparatus 24. The medium driving apparatus 24 may be controlled by practicing a SCSI command transmitted from the SCSI controller 22.

A performance of the SCSI controller 22 is now described. What the data bus and the control signal represent may be indicated by the following phases. Specifically, data on the data bus may be represented by prescribed types of phases corresponding to any one of data read from the program and/or data storage medium 4a, data to be written thereto, and a SCSI command.

Further, data of the device state registry of the driving apparatus and data to be stored in a control register (not shown) may also be represented by corresponding phases. The SCSI command may include all of a "Test Unit Ready" command for determining whether the program and/or data storage medium driving apparatus 24 is available, "Request Sense" for examining a reason why a SCSI command is not correctly practiced, and "Inquiry" for examining a sort of the program and/or data storage medium driving apparatus 24.

Further, "Sense Diagnostic" for executing self-diagnosis or a similar operation may be included. The "Sense Diagnostic" may be recognized, for example, if data of "ID" including sexadecimal code appears on the data bus 20 in a command phase. The SCSI controller 22 may produce a program of the SCSI control use by determining phases in the above-described manner and identifying data appearing on the data bus 20. In that case, when the "phase" may be switched with the "apparatus condition monitor", since contents of the apparatus status register appear on the data bus 20 after execution of the self-diagnosis, the SCSI controller may obtain the result of the self-diagnosis. These operations may be performed as a standard function of the SCSI controller 22.

The program and/or data storage medium control circuit 23 may analyze the SCSI command and generate a control signal necessary for operating the driving apparatus 24. Moreover, the program and/or data storage medium control circuit 23 may execute mutual data transmission and a monitoring operation of the recording apparatus 4.

A modification of the electronic filing system of the present invention is now described. When either a counterfoil or preservation of a prescribed material in a sheet document state is required, the material is sometimes copied by a copier and filed in a sheet stack.

However, according to the electronic filing system of the modification of the present invention, document information may be electronically filed into a recording medium, preferably a CD-ROM having a large capacity. Such document information may be sought during its retrieval operation executed by a personal computer when a prescribed document information is required.

When enabling such an electronic filing system to be practically available in a company, such an electronic filing system may be implemented in a personal computer of each of employees with a scanner. In addition, a program and/or data storage medium, such as a CD-RW, which stores a trigger program for starting a reading condition inputting software, may be delivered to each employee of the company. Several data, such as a name, an employee number, a reading condition information, or the like, may be stored in the CD-RW as described earlier.

When the CD-RW is inserted into a CD-RW drive (not shown) built-in or connected to the personal computer, which installs the auto start instructing program 31 and reading condition information, a controller of a CD-RW driver may initially detect setting of the CD-RW. An image reading program on an original system implemented in the personal computer may start the trigger program, and thereby the filing system may be started. An operation subsequently performed may be substantially the same as described in the earlier described embodiment.

Further, another program, which enables an electronic filing system to selectively display a reading condition inputting screen or to immediately start reading an original document when the CD-RW is inserted into the CD-RW drive, can be installed.

Obviously, numerous additional modifications and variations of the present invention are possible in light of the above teachings. It is therefore to be understood that within the scope of the appended claims, the present invention may be practiced otherwise than as specifically described herein.

What is claimed as new ad design to be secured by letter patent of the united states is:

1. An electronic filing system including a personal computer with an image reading apparatus, said electronic filing system comprising:
    a storage medium configured to store at least a computer readable program enabling a display of the personal computer to display a reading condition inputting screen, and information of one or more reading conditions to be displayed on the reading condition inputting screen, said storage medium being detachably connected to the personal computer, wherein said image reading apparatus reads image data based on the one or more reading conditions; and
    a data recording apparatus configured to record image data read by the image reading apparatus in the data storage medium, said data recording apparatus being provided in the personal computer.

2. An electronic filing system according to claim 1, further comprising a detecting device configured to detect whether the data storage medium is connected to the data recording apparatus by an operator action, wherein said reading condition inputting screen displaying program is executed when the detecting device detects connection of the data storage medium to the data recording apparatus.

3. An electronic filing system according to claim 2, wherein said reading condition inputting screen first displays one or more reading conditions as defaults.

4. An electronic filing system according to claim 3, wherein said firstly displayed one or more reading conditions can optionally be changed and preserved by an operator.

5. An electronic filing system according to claim 4, wherein said one or more reading conditions changed are displayed when said data storage medium is again connected and an electronic filing operation is newly executed.

6. An electronic filing system according to claim 1, further comprising a detecting device configured to detect whether the data storage medium is connected to the data recording apparatus, wherein the image reading apparatus starts its operation while the reading condition inputting screen is not displayed when the detecting device detects connection of the data storage medium to the recording apparatus and contents of preserved reading conditions are not changed.

7. An electronic filing system according to claim 1, further comprising a determining device configured to determine if the data storage medium is suitable for the personal computer, wherein said electronic filing system is not operated if it is determined that the data storage medium is not suitable.

8. An electronic filing system according to claim 7, further comprising a determining device configured to determine if the one or more reading conditions information can be realized in the electronic filing system, wherein said electronic filing system is not operated if the one or more reading conditions information can not be realized.

9. A computer readable data storage medium storing a program practiced in the electronic filling system according to claim 1.

10. A method of electronically filing image data comprising:
    storing at least a computer readable program, which enables a display of the personal computer to display a reading condition inputting screen, and information of one or more reading conditions to be displayed on the reading condition inputting screen in a data storage medium;
    detachably connecting the data storage medium to the personal computer;
    reading image data based on the one or more reading conditions; and
    recording image data read in the data storage medium.

11. A method according to claim 10, further comprising the steps of detecting whether the data storage medium is connected to the data recording apparatus by an operator action, and executing said reading condition inputting screen displaying program when the detecting device detects connection of the data storage medium to the data recording apparatus.

12. A method according to claim 10, further comprising the steps of detecting whether the data storage medium is connected to the data recording apparatus, and starting operation while the reading condition inputting screen is not displayed when the detecting step detects the data storage medium connected to the recording apparatus and contents of preserved reading conditions are not changed.

13. A method according to claim 10, further comprising the steps of determining if the data storage medium is suitable for the personal computer, and stopping an operating of the electronic filing system if it is determined that the data storage medium is not suitable.

14. A method according to claim 13, further comprising the steps of determining if the one or more reading condition information can be realized in the electronic filing system, and stopping the electronic filing system if the one or more reading condition information can not be realized.

15. An electronic filing system including a personal computer with image reading means, said electronic filing system comprising:
    storing means for storing at least a computer readable program enabling displaying means of the personal computer to display a reading condition inputting screen, and information of one or more reading conditions to be displayed on the reading condition inputting screen, said storing means being detachably connected to the personal computer, wherein said image reading means reads image data based on the one or more reading conditions; and data recording means for recording image data read by the image reading means in the data storing means.

* * * * *